United States Patent
Kleijnen et al.

(10) Patent No.: US 11,867,373 B2
(45) Date of Patent: Jan. 9, 2024

(54) BENDABLE LIGHTING DEVICE

(71) Applicant: LUMILEDS LLC, San Jose, CA (US)

(72) Inventors: Christian Kleijnen, Ell (NL); Floris Maria Hermansz Crompvoets, Bunde (NL); Danny de Kreij, Kerkrade (NL)

(73) Assignee: LUMILEDS LLC, San Jose, CA (US)

( * ) Notice: Subject to any disclaimer, the term of this patent is extended or adjusted under 35 U.S.C. 154(b) by 0 days.

(21) Appl. No.: 18/007,719

(22) PCT Filed: Jun. 3, 2021

(86) PCT No.: PCT/US2021/035798
§ 371 (c)(1),
(2) Date: Dec. 1, 2022

(87) PCT Pub. No.: WO2021/247935
PCT Pub. Date: Dec. 9, 2021

(65) Prior Publication Data
US 2023/0235869 A1    Jul. 27, 2023

Related U.S. Application Data

(60) Provisional application No. 63/034,188, filed on Jun. 3, 2020.

(30) Foreign Application Priority Data

Jul. 29, 2020 (EP) .................................... 20188390

(51) Int. Cl.
*F21S 41/24*    (2018.01)
*F21S 41/176*   (2018.01)
(Continued)

(52) U.S. Cl.
CPC ............. *F21S 41/24* (2018.01); *F21S 41/143* (2018.01); *F21S 41/151* (2018.01); *F21S 41/176* (2018.01)

(58) Field of Classification Search
CPC .......... F21S 4/22; F21S 41/143; F21S 41/151; F21S 41/176; F21S 41/24; F21S 43/14;
(Continued)

(56) References Cited

U.S. PATENT DOCUMENTS 6,874,924 B1 *  4/2005  Hulse ................... G02B 6/0001
                                                        362/555
10,619,828 B2 *  4/2020  Tremaine .................. F21S 4/22
(Continued)

FOREIGN PATENT DOCUMENTS

CN    103582290 A    2/2014
DE    202005002425 U1    4/2005
(Continued)

OTHER PUBLICATIONS

International Search Report and Written Opinion dated Sep. 29, 2021 for PCT International Application No. PCT/US2021/035798.
(Continued)

*Primary Examiner* — Zheng Song
(74) *Attorney, Agent, or Firm* — Volpe Koenig

(57) ABSTRACT

Lighting devices, methods of manufacturing a lighting device, automotive lighting systems including the lighting device are described. A lighting device includes at least one light guide with an elongated recess. Multiple light-emitting elements are embedded into the recess of the light guide, arranged on a flexfoil that is bendable in three different connections, and connected to one another to mimic a filament. At least one encapsulating material encapsulates, at least in part, the at least one light guide. The at least one encapsulating material includes at least one opening and at least one reference element for aligning the at least one light guide in relation to the encapsulating material so that the multiple light-emitting elements emit light exiting the open-
(Continued)

ing. The at least one encapsulating aterial is flexible so that the lighting device is bendable in three different directions.

16 Claims, 8 Drawing Sheets

(51) Int. Cl.
*F21S 41/143* (2018.01)
*F21S 41/151* (2018.01)

(58) Field of Classification Search
CPC ........ F21S 43/15; F21S 43/195; F21S 43/235; F21S 43/26; F21S 43/27; F21Y 2103/10; F21Y 2115/10; B60Q 3/64; B60Q 3/78
See application file for complete search history.

(56) References Cited

U.S. PATENT DOCUMENTS

| | | | |
|---|---|---|---|
| 11,098,887 B1* | 8/2021 | Irons | F21V 31/04 |
| 11,293,606 B2 | 4/2022 | Kager | |
| 2010/0039813 A1 | 2/2010 | Sloan et al. | |
| 2012/0327652 A1* | 12/2012 | Lee | F21V 7/0008 |
| | | | 362/235 |
| 2013/0107526 A1 | 5/2013 | Ishibashi et al. | |
| 2014/0104867 A1* | 4/2014 | Meng | F21V 17/002 |
| | | | 362/555 |
| 2015/0260361 A1* | 9/2015 | Cho | F21V 31/005 |
| | | | 362/249.04 |
| 2017/0254518 A1* | 9/2017 | Vasylyev | F21V 19/003 |
| 2018/0149321 A1* | 5/2018 | Torvinen | H05K 1/181 |
| 2018/0226004 A1* | 8/2018 | Lin | A47C 7/725 |
| 2019/0317262 A1 | 10/2019 | Benter et al. | |
| 2020/0025343 A1 | 1/2020 | Labas | |
| 2021/0293391 A1* | 9/2021 | Weijers | F21V 23/003 |
| 2023/0204169 A1* | 6/2023 | Van Bommel | F21K 9/232 |
| | | | 362/217.01 |

FOREIGN PATENT DOCUMENTS

| | | |
|---|---|---|
| JP | 2011-249534 A | 12/2011 |
| KR | 20140030554 A | 3/2014 |
| WO | 03/088421 A1 | 10/2003 |
| WO | 2018/087072 A1 | 5/2018 |

OTHER PUBLICATIONS

International Preliminary Report on Patentability Chapter I dated Dec. 6, 2022 for PCT International Application No. PCT/US2021/035798.
Extended European Search Report dated Jan. 13, 2021 for European Patent Application No. 20188390.7.

\* cited by examiner

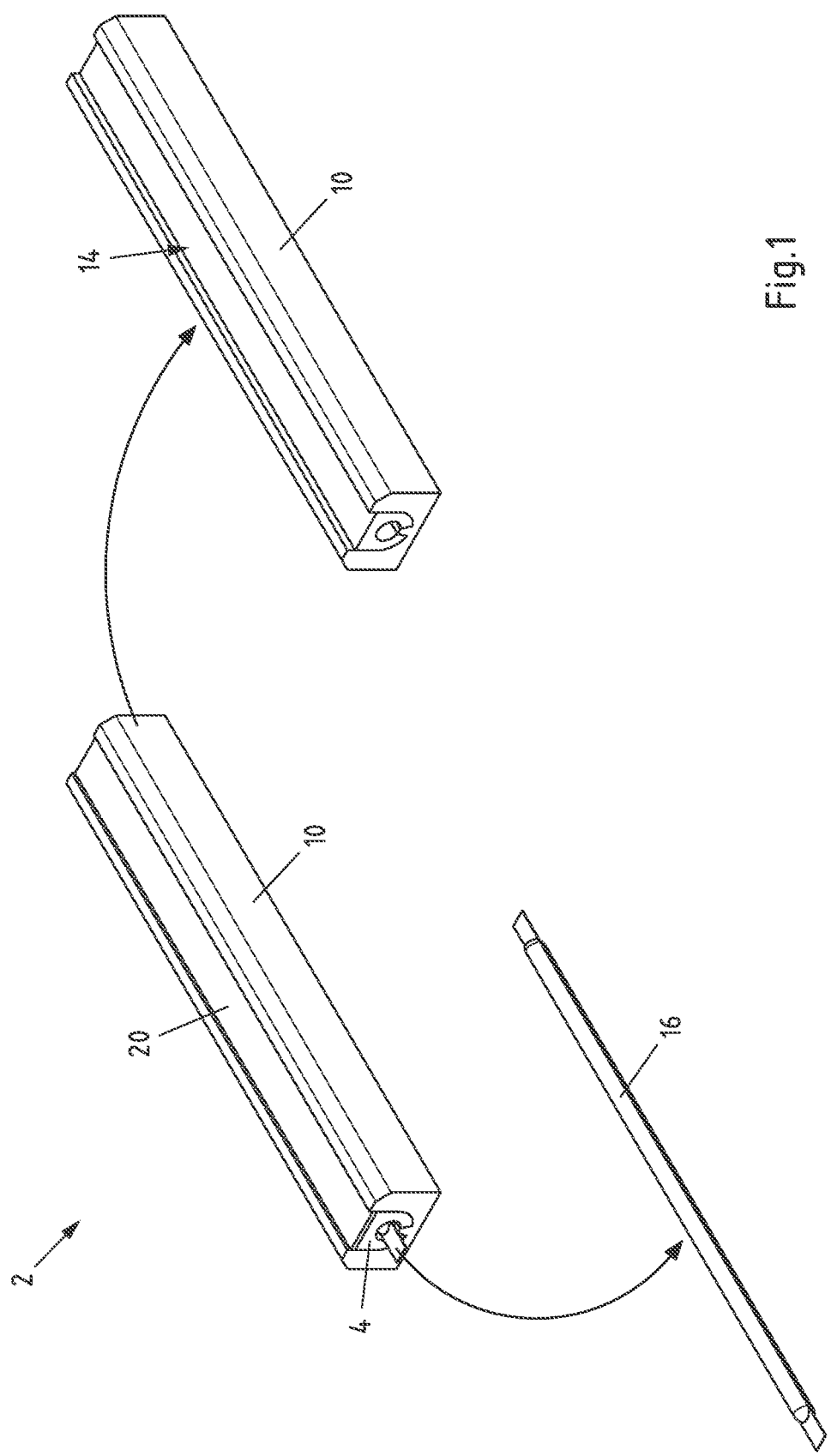

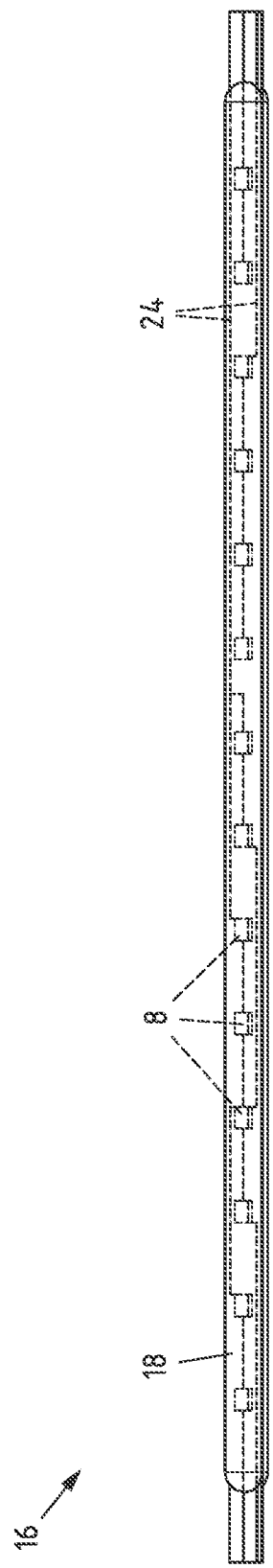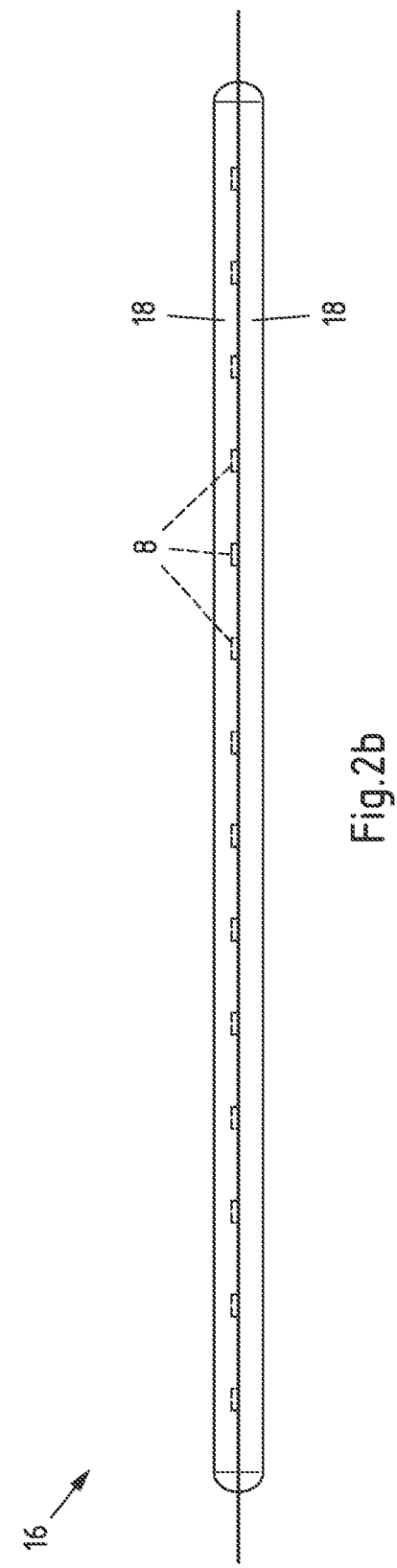

BENDABLE LIGHTING DEVICE

CROSS REFERENCE TO RELATED APPLICATIONS

This application is a § 371 application of International Application No. PCT/US2021/035798, filed Jun. 3, 2021, which claims the benefit of U.S. Provisional Patent Application No. 63/034,188, which was filed on Jun. 3, 2020, and European Patent Appln. No. 20188390.7, which was filed on Jul. 29, 2020, the contents of which are hereby incorporated by reference herein.

BACKGROUND

Light-emitting elements, such as LEDs, may be arranged on a substrate that is also used for electrical connection of the light-emitting elements. For example, light-emitting elements may be arranged on a printed circuit board (PCB) that comprises conductive tracks to provide the light-emitting element with electrical energy. However, substrates such as a PCBs may restrict the shape of a lighting device, such as to an essentially flat shape in case of a simple board.

SUMMARY

Lighting devices, methods of manufacturing a lighting device, automotive lighting systems including the lighting device are described. A lighting device includes at least one light guide with an elongated recess. Multiple light-emitting elements are embedded into the recess of the light guide, arranged on a flexfoil that is bendable in three different connections, and connected to one another to mimic a filament. At least one encapsulating material encapsulates, at least in part, the at least one light guide. The at least one encapsulating material includes at least one opening and at least one reference element for aligning the at least one light guide in relation to the encapsulating material so that the multiple light-emitting elements emit light exiting the opening. The at least one encapsulating material is flexible so that the lighting device is bendable in three different directions.

BRIEF DESCRIPTION OF THE DRAWINGS

A more detailed understanding can be had from the following description, given by way of example in conjunction with the accompanying drawings wherein:

FIG. 1 is a schematic representation of an example lighting device in perspective view;

FIGS. 2a and 2b are each schematic representations of a flexfoil filament and a flexfoil with hemispherical emission in a top view (FIG. 2a) and a side view (FIG. 2B);

FIG. 3b is a cross-sectional view of the lighting device of FIG. 3a;

DETAILED DESCRIPTION

Figure 3A:
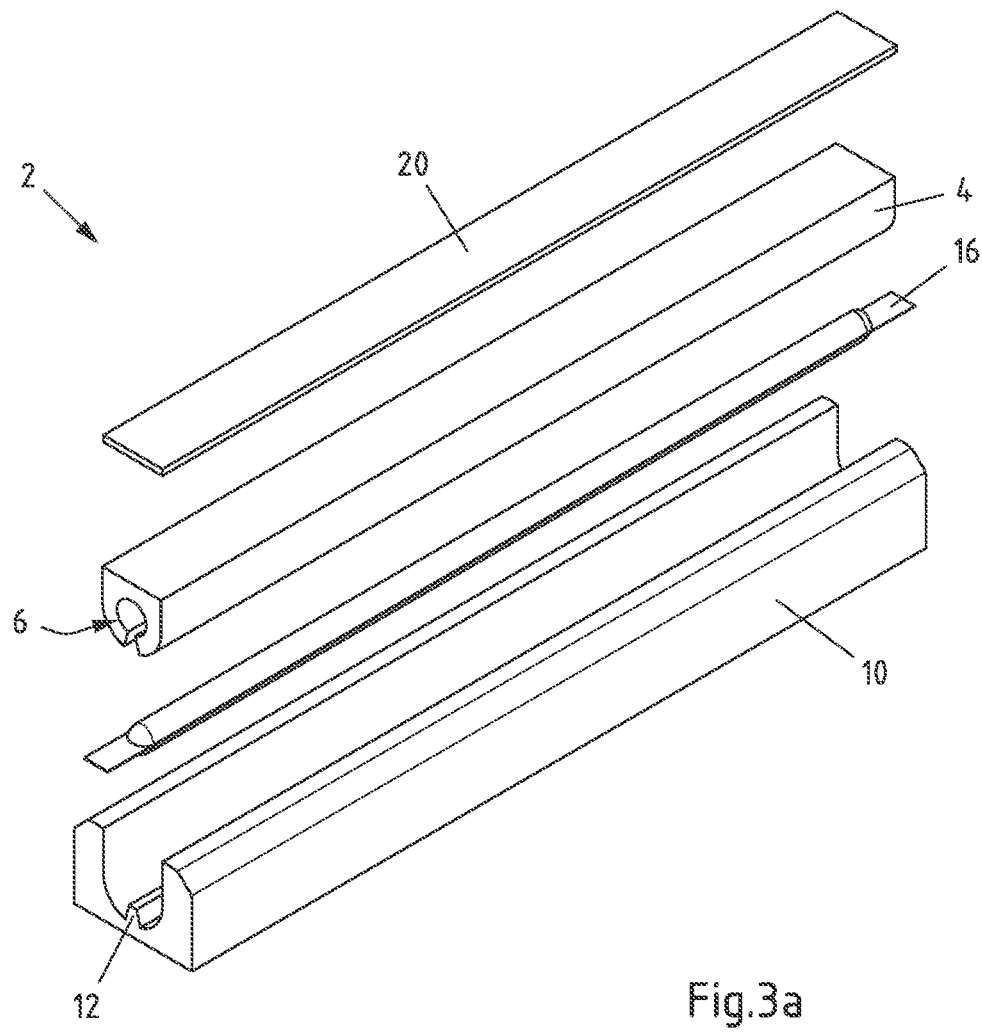
FIG. 3a is an exploded view of an embodiment of a lighting device.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

For many applications, it may be desirable to provide a lighting device that can be brought into various shapes and has, for instance, flexible properties. A flexible lighting device may be used to conform to the shape of an object. For example, in automotive applications, a flexible lighting device may follow a surface or lines of a car body or of elements of the car interior, such as panels or the dashboard. Similarly, flexible lighting devices may be used in architecture or interior decoration and may easily be integrated into structures.

For automotive lighting applications, it may be desirable to provide for styling the signaling functions in a lamp either for rear signaling functions, such as turning signal, position light, stop-light or braking light, as well as for front signaling functions, such as position light or day running light (DRL), to name but a few examples. These signaling applications are often designed as line emitters in car lamps.

Further, automotive applications requiring styling of light are moving into the car body, such as in the grill, out of the head lamp, or even into the interior of a car. A product providing a high freedom of styling for line sources, like a bi-axial bendable line emitter, may fulfil certain of such styling requirements.

Current so-called 3D LED architecture may meet automotive signaling application specifications, but may also have, due to its system complexity, a high bill of materials, such as silicone, wiring, and boards. In addition, the building and assembly processes for the modules may be relatively complex, in particular the wireframe and board placements. Further, the thermomechanical stress may be a challenge for robustness over lifetime, especially when the system is shaped and integrated in a fixture.

Embodiments described herein may provide for a lighting device, such as for automotive applications, and corresponding methods of manufacture, that may provide for a desired 3D-shape while simplifying the bill of materials, simplifying building and assembly processes and reducing thermomechanical stress.

FIG. 1 is a schematic representation of an example lighting device 2 in perspective view. In some embodiments, the lighting device may represent, for example, an optical system. In the example illustrated in FIG. 1, the lighting device 2 comprises a front-end part, a flexfoil filament 16, a back-end part, a light guide 4 and an encapsulating material 10 of the flexfoil filament 16. The arrows shown between the assembled lighting device 2 and the front-end part and the back-end part indicate that the lighting device 2 can be manufactured by combining the flexfoil filament 16 with the encapsulating material 10. In embodiments, the flexfoil may enable that lighting device to be bendable in three directions, for example in X-, Y- and Z-directions.

A flexfoil, as used herein, may refer to a flexible strip that may comprise a number of conductor tracks provided by the flexible strip. With the conductor tracks, one or more light-emitting elements can be connected with each other. Further, by connecting a power source as well, the one or more light-emitting elements can be driven to emit light. The flexfoil may be very thin and can be bent in at least three different directions. The flexfoil may represent a carrier on which the light-emitting elements can be arranged.

The flexfoil may be of elongated shape so that a plurality (e.g., at least two) of light-emitting elements can be arranged on the flexfoil. The light-emitting element may mimic a filament. The flexfoil may comprise or being made of polyimide foil with leads, to name but one non-limiting example. The leads may represent conductor tracks for connecting one or more light-emitting elements arranged on the flexfoil. The flexfoil may be very thin, such as between 20 μm and 40 μm thickness.

Such a flexfoil may be compact. Further, it may allow a narrower light emitting area, which may be beneficial for optical design in general and optical integration in particular. The width of such a flexfoil may allow slim, low energy architecture (LEA) of 2 mm or less, which may be beneficial for optical design.

In the example illustrated in FIG. 1, the encapsulating material comprises an opening 14 that is covered by an optical element, a diffusor 20 in the illustrated example. Light emitted by the light-emitting elements, which may be mini LEDs, of the flexfoil filament 16 may be emitted in the direction of the opening 14 and may be diffused by the optical element 20. The light guide 4 may comprise an elongated recess 6 (not shown in FIG. 1). Further, the encapsulating material 10 may comprise a reference element 12, and the height of the reference element may extend within and on the bottom side of the encapsulating material 10. The reference element 12 may be for aligning the light guide 4 in relation to the encapsulating material 10 when the flexfoil filament 16 is embedded (e.g., inserted) into the light guide 4. The light guide 4 may be embedded (e.g., inserted) into the encapsulating material 10. The light guide 4 may comprise a recess 6 matching to the reference element 12 of the encapsulating material 10. When the light-emitting elements 8 of the flexfoil filament 16 are driven by a power source, light may be emitted in such a way that it exits the opening 14 of the encapsulating material 10. In the illustrated example, the light is also diffused by the diffusor 20.

The light guide may also be referred to as mixbox. The at least one light guide may be optically coupled to the light-emitting elements. Such a light guide can carry optical light over a distance via a particular route to a defined light-emitting surface, for example with minimal loss. The radiation characteristic of the light emitted from the light guide can hence be precisely controlled to, for example, fulfil legal requirements. To this end, a suitable transmittance and/or reflectivity of the surfaces of the light guide can be adjusted. The light guide may be manufactured from any suitable optically transparent material and may comprise a recess in which the light-emitting elements can be embedded. In case the light-emitting elements are arranged on a flexfoil, the flexfoil can be embedded into the recess. The flexfoil may be a carrier for the light-emitting elements. In this way, light emitted by the light-emitting elements may be guided by the light guide in one or more directions. For instance, the light guide may mix the light emitted by the light-emitting elements in such a way that the light is evenly distributed in a certain direction.

According to an exemplary embodiment of the invention, the encapsulating material may be or comprise silicone. The encapsulating material may be flexible. By being flexible, the lighting device and the components in the lighting device can be bent in up to three different directions, for example simultaneously. This maybe enable the lighting device to be formed to correspond to a required shape, such as predefined by automotive head or back lamp and/or by a certain interior or outer body part of a vehicle, to name but a few non-limiting examples. The encapsulating material may surround the flexfoil.

The lighting device described herein may thus enable a bendable lighting device by using a, for example, ultra-compact flexfoil with high integration of light-emitting elements, such as mini LEDs or dies, which may be assembled so that it represents an elongated optical system. Such an optical system may add a mechanical interface that may enable easier integration by a defined interface provided by the back-end system represented by the encapsulating material, which can hold further features for optical and mechanical referencing and fixation, to name but a few non-limiting examples. For instance, such optical and mechanical referencing and fixation may enable to mount the lighting device to an interior element, or a car body part, or into a head or back light of a vehicle.

According to some embodiments, the at least one reference element may be an elongated height extending along the opening in the longitudinal direction of the lighting device. This may enable to configure the encapsulating material basically as a semi-finished product in an endless or one-dimensional manner. Thus, the height may be located steadily throughout the encapsulating material. The height may be shaped in such a way to allow for engagement with the light guide so that when the encapsulating material and the light guide are assembled, both may be referenced to each other in a pre-defined way.

According to some embodiments, the at least one reference element may further enable a sealing of the at least one light guide and the encapsulating material. Thus, the lighting device may have some sort of water-proofing capabilities. Further, this may also reduce thermomechanical stress since, in case the encapsulating material is at least silicone based, during temperature changes, the lighting device may typically expand and shrink, especially when the flexfoil filament or the flexfoil with hemispherical emission is mounted in an outer part of a vehicle. The sealing of the lighting device can enable that temperature changes may not affect the performance of the lighting device.

FIGS. 2a and 2b are each schematic representations of a flexfoil filament and a flexfoil with hemispherical emission in a top view (FIG. 2a) and a side view (FIG. 2B). FIG. 2a illustrates a flexfoil 16 that is coated with a phosphor coating 18. The flexfoil 16 may be in the form of a flexfoil strip. Multiple light-emitting elements 8 may be arranged on the flexfoil strip and may be connected by conductive tracks 24. The phosphor coating 18 may be applied (e.g., molded or dispensed) on the top side of the flexfoil strip. This may enable a hemispherical emission of light when the multiple of light-emitting elements 8 are powered. A power source (not shown in FIGS. 2a and 2b) may be connected via the conductive tracks 24. Light may not be emitted on the bottom side. To enhance the blocking of light, optionally a further coating blocking light to be emitted on the bottom side may be applied onto the flexfoil strip.

In the example illustrated in FIG. 2b, a flexfoil 16 is coated with a phosphor coating 18 on both of its sides. This is indicated in FIG. 2b by the phosphor coating 18 marked by two corresponding reference signs. In accordance with the flexfoil 16 of FIG. 2a, on the flexfoil strip of FIG. 2b, multiple light-emitting elements 8 may be arranged. The multiple light-emitting elements 8 may be connected by conductive tracks 24. Covering the flexfoil strip on both sides, for example with a phosphor coating 18, may enable an omnidirectional emission of light when the multiple of light-emitting elements 8 are driven. Thus, the flexfoil strip of FIG. 2b may emit light to all sides and the light may be evenly distributed. While a phosphor coating is described above, it will be understood that other coatings of the flexfoil strip to adapt the flexfoil strip to certain optical requirements and/or applications may be possible.

The light-emitting elements, and optionally the flexfoil and other parts, such as a coating on the flexfoil covering the light-emitting elements, may represent a front-end part of the lighting device. By having a deeper system integration of the front-end part where, for example, LEDs (L0, die level) are directly integrated or arranged on a flexfoil carrier, a miniaturization can be achieved having large cost benefits during manufacture while maintaining key benefits of 3D bendable optical systems, such as the above mentioned 3D LED system. The key benefits may be regarded to be compactness of the lighting device and high uniformity of light emitted by the lighting device regardless of the shape in which the lighting device is to be bent. Some compromise may be made regarding the flexibility and/or bendability of the lighting device, which might be reduced, and flux might also be reduced due to the utilization of the flexfoil and the at least one light-emitting element embedded into the light guide. However, the applications described herein may easily allow these minor compromises.

The lighting device may have a longitudinal direction that may correspond to the longest dimension of the lighting device. The light-emitting elements may be at least partially arranged along the longitudinal direction relative to each other. The light-emitting elements may, for example, be arranged in intervals along the longitudinal direction in regular or irregular intervals. For instance, the lighting device may substantially comprise the shape of a strip, for example with a substantially constant cross section. With this arrangement of the light-emitting elements, the lighting device may be configured as a semi-finished product in an endless or one-dimensional manner, significantly reducing production costs and allowing choosing the length of the lighting device after production of the semi-finished product.

In some embodiments, the multiple light-emitting elements may be arranged with a density of at least one light-emitting element being arranged every 1 to 3 mm along the longitudinal direction of the flexfoil. Alternatively, about 10 to 100 light-emitting elements may be arranged per $cm^2$ area of the flexfoil. The light-emitting elements may be arranged in a row. Additionally, the light-emitting elements may be arranged over the width of the flexfoil.

By arranging the light-emitting elements in such a density, compact light-emitting elements (e.g., mini LED dies) and low currents can be used to power the light-emitting elements. This may enable use of small conductor tracks of 20 to 40 micron minimum. Due to less space consumption required for the routing of the conductor tracks, the flexfoil can easily facilitate more conductor tracks. Even the total width of the flexfoil can be limited to 1.5 mm or less. A higher amount of routing conductor tracks distributed over the width of the flexfoil may provide more addressable segments of light-emitting elements, in case such a dynamic to control the light-emitting elements at least in part separate from each other is desired or required by certain lighting appliances specifications.

Further, having a very high density of LEDs in the range of 1 to 3 mm pitch in combination with the before mentioned mini-LED dies (of low power) and having a size of 0.1×0.5 mm or smaller along the longitudinal direction of the flexfoil may make it easier to achieve high uniformity of emitted light in a smaller volume. This may negate a need for a dedicated diffusor. In addition, this may reduce the size of the lighting device, thereby increasing the attractiveness for several automotive applications (e.g., rear, position, car body lighting, etc.). Not using a dedicated diffusor may make optical integration of the lighting device into one or more other elements (e.g., car body or automotive lamp) easier, since the lighting device used as a light source may be small and may provide homogeneous emission of light. The etendue may be small as well so that it can be put to use in, for example, collimating optics, to name but one non-limiting example. Further, it may also reduce cost on bill of materials (BOM) due to its potential increased compactness.

A high population of light-emitting elements (e.g., mini LED dies) may make it easier to distribute heat over the surface of the line emitter, especially in the case of silicone at least being comprised by the encapsulating material since silicone has poor thermal properties for conductance. By using low power (e.g., 10 mA, 2.68V for blue mini LED dies), local heat generated by the light-emitting elements can be limited.

The phosphor coating may act as a wavelength converter, enabling, for example, to change the frequency of the light that is visible. It will be understood that in addition or in alternative to the phosphor coating, a respective coating that blocks light in a certain direction and/or that defines a certain wavelength and/or intensity in which the emitted light is converted can be used.

For color or light distribution of the emitting light, a phosphor in silicone or metal oxide (e.g., TiO2) in silicone can be applied as a coating for optical functionality onto the light-emitting elements on the flexfoil. The coating (e.g., phosphor in silicone or metal oxide in silicone) may be arranged on one or both sides of the flexfoil. This can be done on one side providing a source with hemispherical emissions. In case a transparent or translucent flexfoil is used and phosphor in silicone or metal oxide in silicone is applied on both sides, an omnidirectional emitting flexfoil filament may be achieved. Thus, if the flexfoil has at least one light-emitting element arranged on both of its sides, the emission of light may be omnidirectional. The flexfoil may either be transparent or opaque. Such an omnidirectional emission of light may also be enabled if the flexfoil is transparent and has at least one light-emitting element on one side, not on both sides. Then, even if at least one light-emitting element is arranged on one side of the flexfoil, the emission of light may be omnidirectional since it can penetrate through the transparent flexfoil. As used herein, the flexfoil and the at least one light-emitting element providing omnidirectional emission of light may also be referred to as flexfoil filament. Such a type of flexfoil filament typically finds their application in retrofit light bulbs.

In the alternative, the flexfoil and at least one light-emitting element providing hemispherical emission may also be referred to as flexfoil with hemispherical emission. Such a flexfoil with hemispherical emission may emit light to one side of the flexfoil. Such a flexfoil with hemispherical emission may, thus, have a blocking layer on the opposite side, or may be opaque (e.g., a solid layer) or not be transparent so that the emission of light may be directed to one side of the flexfoil. The blocking layer or solid layer may ideally be reflective for efficiency reasons. In this way, as little light as possible may be lost, and at least a part of the reflected light can be emitted in the intended direction.

In some embodiments, the phosphor coating covers both sides of the flexfoil, wherein the at least one light-emitting element may be arrangeable on both sides of the flexfoil. In case of multiple light-emitting elements, at least one light-emitting element can be arranged on one side, and at least one further light-emitting element can be arranged on the opposite side of the flexfoil. Such a flexfoil filament or the flexfoil with hemispherical emission can be embedded into the recess of the light guide, such as by inserting the flexfoil filament or the flexfoil with hemispherical emission into the recess. The recess may be of a shape corresponding to the cross-section diameter of the flexfoil filament or the flexfoil with hemispherical emission, and optionally the coatings. Alternatively, the recess may be of a shape larger than the cross-section diameter of the flexfoil filament or the flexfoil with hemispherical emission so that an air chamber surrounding the flexfoil filament or the flexfoil with hemispherical emission may be established.

Due to the compactness of the flexfoil with hemispherical emission or the flexfoil filament, thermomechanical stress due to torsion and powering of the light-emitting elements can be reduced since the light-emitting elements or the flexfoil filament or the flexfoil with hemispherical emission may be situated in an air chamber. This may allow for a thermomechanical decoupling between the light-emitting elements or the flexfoil filament or the flexfoil with hemispherical emission and the light guide and/or the encapsulating material representing a back-end of an optical system to be complemented by the lighting device. The air chamber may have optical advantages as, for good optical performance, often a high refractive index contrast is desired and with an air gap one can achieve the highest contrast possible (e.g., air to silicone=1:~1.4).

In some embodiments, torsion of the lighting device may be optically compensated by the light being emitted equally in all directions of the flexfoil. By integrating and/or embedding an omnidirectional emitting flexfoil filament, torsion of the lighting device may be optically compensated by the emission of light that may be equal on all directions of the flexfoil. For that reason, the torsion and, thus, bending of the lighting device in any one of three different direction, or all of them, may become optically uncritical. Since the emitted light can also escape directly to the bottom of the encapsulating material, high reflective properties of the encapsulating material can be required. For instance, the encapsulating material may have a reflectivity, at least in part, above 95% in reflectance to achieve a well-suited encapsulating material (e.g., mixbox) efficiency. High reflective silicone materials may be used, which may be filled with a metal oxide, for instance TiO2. The load of these materials can be in the range from 5 to 30 wt. %. A too high amount of particle load may make the silicone less flexible and even brittle.

For instance, by integrating the flexfoil in—plane with one of the three bending directions respective axis (e.g., longitudinal direction of the lighting device, e.g., y-axis), allowing torsion at the bending area of the flexfoil can be obtained. This means that the light-emitting elements may locally rotate to another direction than the light-emitting elements arranged in a straight area of the flexfoil in case of torsion. However, due to its compactness and embedding of the flexfoil in the light guide and the encapsulating material, the light that is more directed to the sides due to torsion of the flexfoil may be mixed and may escape from the light emitting area of the encapsulating material. This is assuming that the flexfoil with hemispherical emission is assembled into the encapsulated material. That means that the flexfoil may be mounted as such that light is directed to the light emitting area as defined by the opening of the encapsulating material.

According to some embodiments, the at least one light-emitting element may be in contact, at least in part, with the recess of the at least one light guide. Alternatively, to the air chamber, the light-emitting elements or the flexfoil filament or the flexfoil with hemispherical emission may be in direct contact with the light guide and/or the encapsulating material. Thermomechanical stress may be higher compared to the usage of the above disclose air chamber, but it may enable more tolerance for torsion of the lighting device.

FIG. 3a is an exploded view of an embodiment of a lighting device. In the example illustrated in FIG. 3a, the lighting device 2 comprises a light guide 4, in which a flexfoil filament 16 is embedded. The lighting device 2 may also comprise an encapsulating material 10 with a reference element 12 that may be configured to receive the light guide 4 with the embedded flexfoil filament 16. On top of the light guide 4, the lighting device 2 may comprise an optical element 20, a diffusor in the illustrated example. All of the aforementioned components can be assembled together forming a lighting device 2. Adding a simple diffusor, such as in the form of a layer, can create an off-state-white (or other color) appearance, as specified by the optical element. Thus, the lighting device can be adapted to certain applications/customers as required.

Figure 3B:
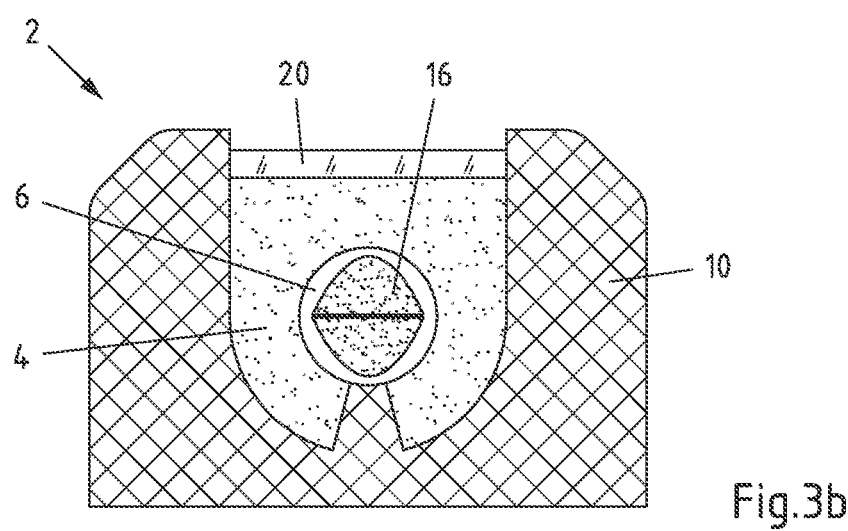

FIG. 3b is a cross-sectional view of the lighting device of FIG. 3a. It can be seen how all of the aforementioned components are assembled together forming the lighting device 2.

Figure 4:
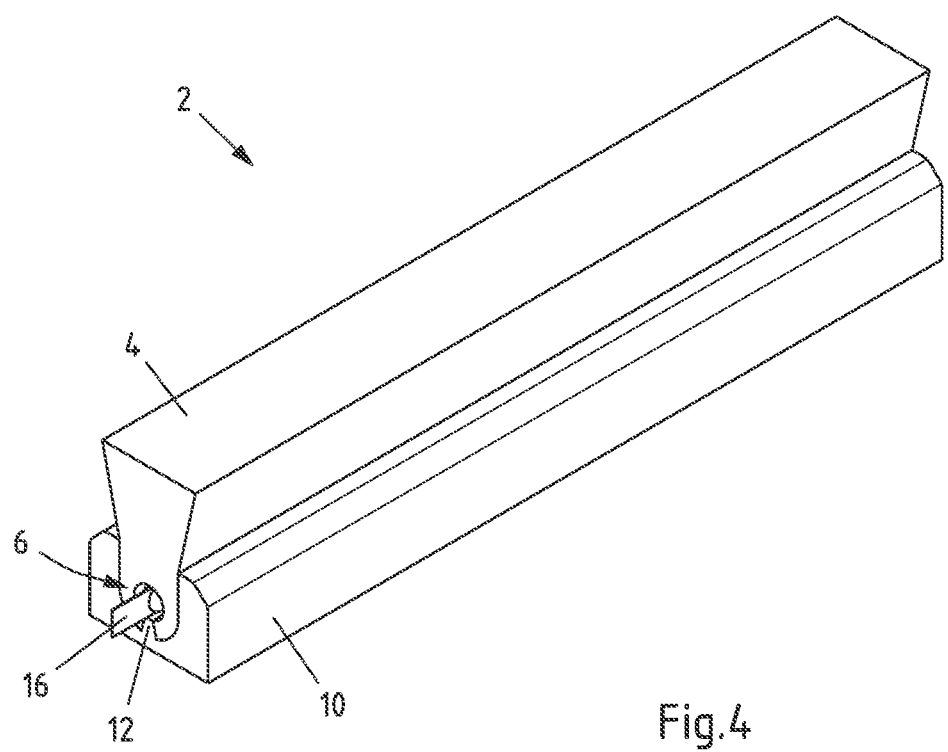
FIG. 4 is a schematic representation of another embodiment of a lighting device in a perspective view.

FIG. 4 is a schematic representation of another embodiment of a lighting device in a perspective view. In the example illustrated in FIG. 4, the light guide 4 has a shape differing from the light guide shown in the previous examples. Further, in contrast to the example embodiments of lighting devices shown in the previous figures, the lighting device 2 of FIG. 4 as shown is not attached to an optical element, such as an automotive lamp, to name but one non-limiting example. In the example illustrated in FIG. 4, the light guide 4 is shaped in such a way that light emitted by the light-emitting elements arranged on the flexfoil, thus, representing the flexfoil filament 16, is guided in one or more certain directions. Further, the light guide 4 may enable adapting the intensity with which the light is emitted. The reference element 12 and the respective recess in the light guide 4 for allowing alignment of the light guide 4 in relation to the encapsulating material 10 may correspond to the respective elements of the example embodiments shown in the previous figures.

Figure 5:
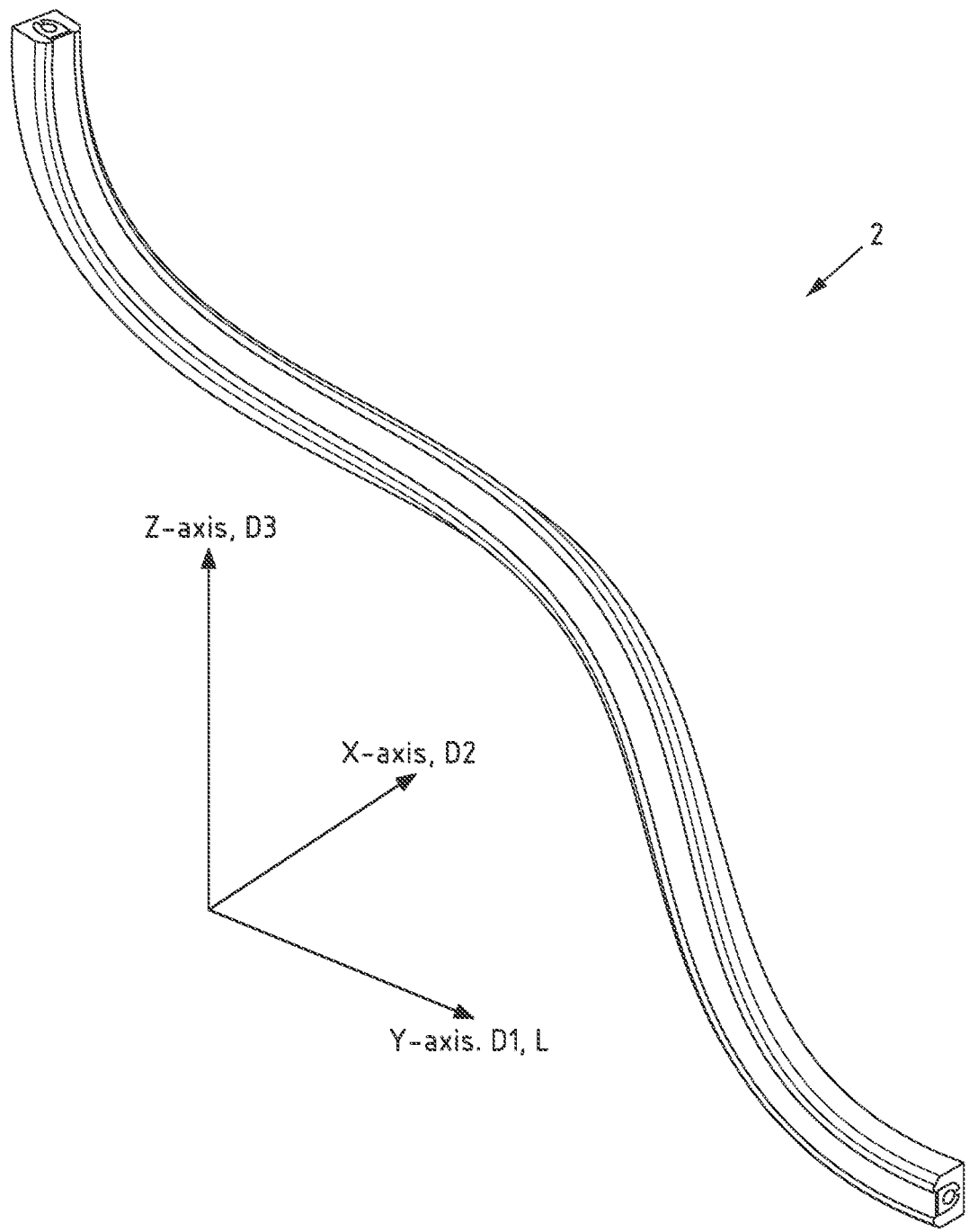
FIG. 5 is a perspective view of a lighting device that is bended in three different directions.

FIG. 5 is a perspective view of a lighting device that is bended in three different directions. In the example illustrated in FIG. 5, three axes—X-axis—D1, Y-axis—D2, and Z-axis—D3—are illustrated. The Y-axis corresponds to the longitudinal directions of the lighting device 2. Thus, the Y-axis extends at the shown lower end of the lighting device 2. The upper end of the lighting device 2 may be elevated in comparison to the lower end. The lighting device 2 may be bended from its shown upper end to the shown lower end in all three of the shown directions. From its upper end, at first, it may bend downwards and to its left side. Then, it may bend further downwards and makes a near 90° right hand turn. Ending in the lower end of the lighting device 2, the lighting device 2 may even out to the flat surface beneath it and make another near 90° left hand turn. Thus, the lighting device 2, and at least the encapsulating material 10 of the lighting device 2, may be flexible such that the lighting device 2 may be bendable. In FIG. 5, for example, it is bent in three different directions, as indicated by reference signs D1, D2, and D3.

When the light-emitting elements 8 of a flexfoil 16 are driven, such as shown in FIG. 5, a high flexible lighting device 2 may be enable that has fluxes, uniformity and compactness, for example due to the integration of a dedicated LED as one of the light-emitting elements and on wire level 2 (L2) solution as represented by the conductive tracks 24.

Such a described front-end technology of the flexfoil filament or the flexfoil with hemispherical emission may be combined with an additional optical system. This may be, for example, a silicone based elongated light guide (e.g., a mixbox) that encapsulates the flexfoil filament or the flexfoil with hemispherical emission. Further, a dedicated diffusor that provides a uniform luminance from the light emitting area may be included. Such an assembly may result in an elongated LED module that can be implemented, for example, in a car lamp, but also in a car body or car interior elements due its bendability.

For applications with more relaxed specifications on optical flux and bending parameters, alternatives to the flexfoil filament or the flexfoil with hemispherical emission, can be considered based on the principle of embedding a thin carrier that comprises at least one light-emitting element, and that may be covered with a coating in a light guide and an encapsulating material, to reduce cost. Further, by using a flexfoil filament or the flexfoil with hemispherical emission, the assembly complexity of such an elongated (e.g., 3D LED) lighting device can be reduced by an easier assembly process. Further, due to the addressing of a part of multiple light-emitting elements on a flexfoil by utilizing the conductive tracks, for instance a bi-color or multi-color flexfoil filament or the flexfoil with hemispherical emission may be achieved. Light-emitting elements emitting light of different wavelength may be arranged on the flexfoil. Further, they may need to be routed in such a way that they can be driven separately.

Sometimes a bi-directional or even omnidirectional emission of light may be preferred (e.g., as part of a surface emitter).This may be done by certain coatings to be applied on the flexfoil.

Easy optical integration of the lighting devices, for example in car lamps (front or back lighting), interior elements (e.g., doors or dashboard), and/or into elements of a car body (e.g., grill and wheel housing) may be enabled. Also, the lighting device according to the first aspect may be scaled up so that a larger light source may be enabled. This may also make optical design possibilities, such as in an optical path, larger. This may also be preferable to meet certain design criteria and/or requirements set out (e.g., standards to be met).

FIG. 1 and FIG. 3a may be considered to show how a bendable elongated module of a lighting device can be manufactured by using a flexfoil filament 16. The flexfoil filament 16 is made of a flexfoil (e.g., polyimide-based) on which electrode (conductive) tracks 24 are laid out to address an array of mini-LEDs 8 (e.g., flip-chips). These mini-LEDs 8 can be blue emitters and may be closely spaced (arranged in a high density on the flexfoil strip). LED emitters of other color can also be used depending on the application needs.

The blue mini-LEDs 8 may be covered with a phosphor mold 18 to convert the blue light to white (or alternatively to another color as required and enabled by a different coating). On the opposite side of the flexfoil, there may also be a phosphor mold 18 as blue light may pass through the transparent flexfoil to the bottom side. The phosphor concentrations of the phosphor coatings 18 on the top and bottom side may be tuned to each other to achieve the right color over angle behavior. Further, the phosphor coating 18 may have scattering properties. In combination with the high density of mini-LEDs 8, this may result in a very uniform luminance appearance of the flexfoil filament 16. If other colors are to be emitted, phosphor may not be used, but as alternatives, such as bare silicone or silicone with some diffuse, colored properties may be applied as a respective coating.

Figure 6:
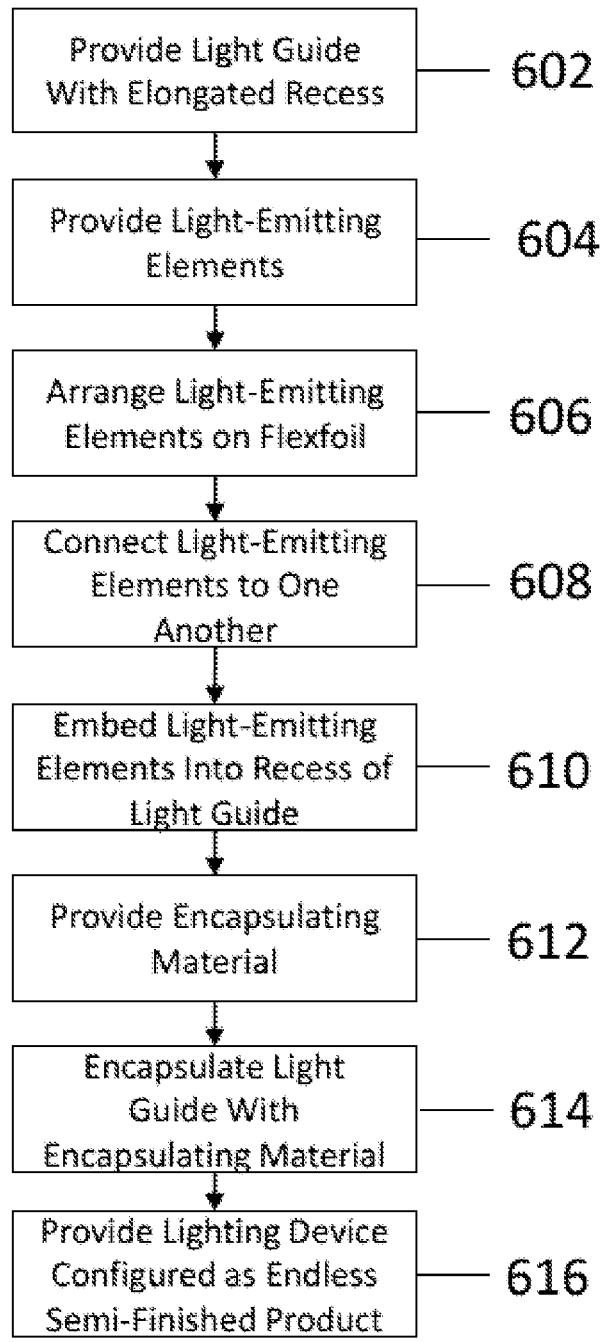
FIG. 6 is a flow diagram of an example method of manufacturing a lighting device.

FIG. 6 is a flow diagram of an example method of manufacturing a lighting device. In the example illustrated in FIG. 6, the method includes providing a light guide comprising an elongated recess (602). Multiple light-emitting elements may be provided (604). The multiple light-emitting elements may be arranged on a flexfoil (606). The flexfoil may be bendable in three different directions. The multiple light-emitting elements may be connected to one another to mimic a filament (608). The light-emitting elements may be embedded into the recess of the light guide (610).

An encapsulating material may be provided (612). The at least one light guide may be encapsulated, at least in part, with the encapsulating material (614). The encapsulating material may include at least one opening for emitting light.

The encapsulating may also include aligning the at least one light guide in relation to the encapsulating material so that the multiple light-emitting elements emit light exiting the opening by the at least one reference element engaging with the elongated recess of the light guide. The lighting device may be provided (616). The lighting device may be configured as an endless semi-finished product having a length to be chosen after production.

In some embodiments, a flexfoil may be embedded in an encapsulating material, such as silicone having an air chamber (e.g., an air gap) established between the flexfoil filament or the flexfoil with hemispherical emission and a light guide when the flexfoil filament or the flexfoil with hemispherical emission is embedded into the light guide. In some embodiments, the embedding may include extruding a whitebox or a white mixbox as a light guide with a recess (e.g., 1K extruded). An encapsulating material (e.g., an air tube) may be extruded (e.g., 1K extruded). A front-end flexfoil assembly may be inserted in the light guide. The length of the light guide and of the flexfoil may correspond to each other.

The light guide may be glued into the whitebox and optionally cured. The gluing process may be controlled such that no excess of glue enters the air chamber. The light guide may be embedded with the flexfoil filament or the flexfoil with hemispherical emission may be encapsulated by the encapsulating material. Optionally, a diffusor may be mounted or dispensed on top of the light guide. The diffusor can be cured for fixation.

The assembly steps described in the paragraphs above may be simplified, and the order of the process steps can differ from these examples. In some embodiments, for example, the whitebox may be extruded in a 2K process using, for example, white for the mixbox and, for example, transparent silicone for the light emitting area. This extrusion process can be extended to integrate additional optics, such as collimators as a respective optical element.

Alternatively, the flexfoil may be embedded in an encapsulating material (e.g., silicone) with no air interface between the flexfoil filament or the flexfoil with hemispherical emission and the encapsulating material. In such embodiments, a whitebox or mixbox of white color may be extruded as a light guy (e.g., 1K extruded). A front-end flexfoil assembly comprising one or more light-emitting elements may be embedded (e.g., inserted) into the whitebox. The white box may be filled with transparent silicone fixing the flexfoil filament or the flexfoil with hemispherical emission inside of the optical system. The light guide embedded with the flexfoil filament may be encapsulated by the encapsulating material. Optionally, a diffusor may be mounted or dispensed on top of a light guide in which the flexfoil filament or the flexfoil with hemispherical emission is embedded (e.g., inserted). Then, it may be cured for its fixation.

Figure 7:
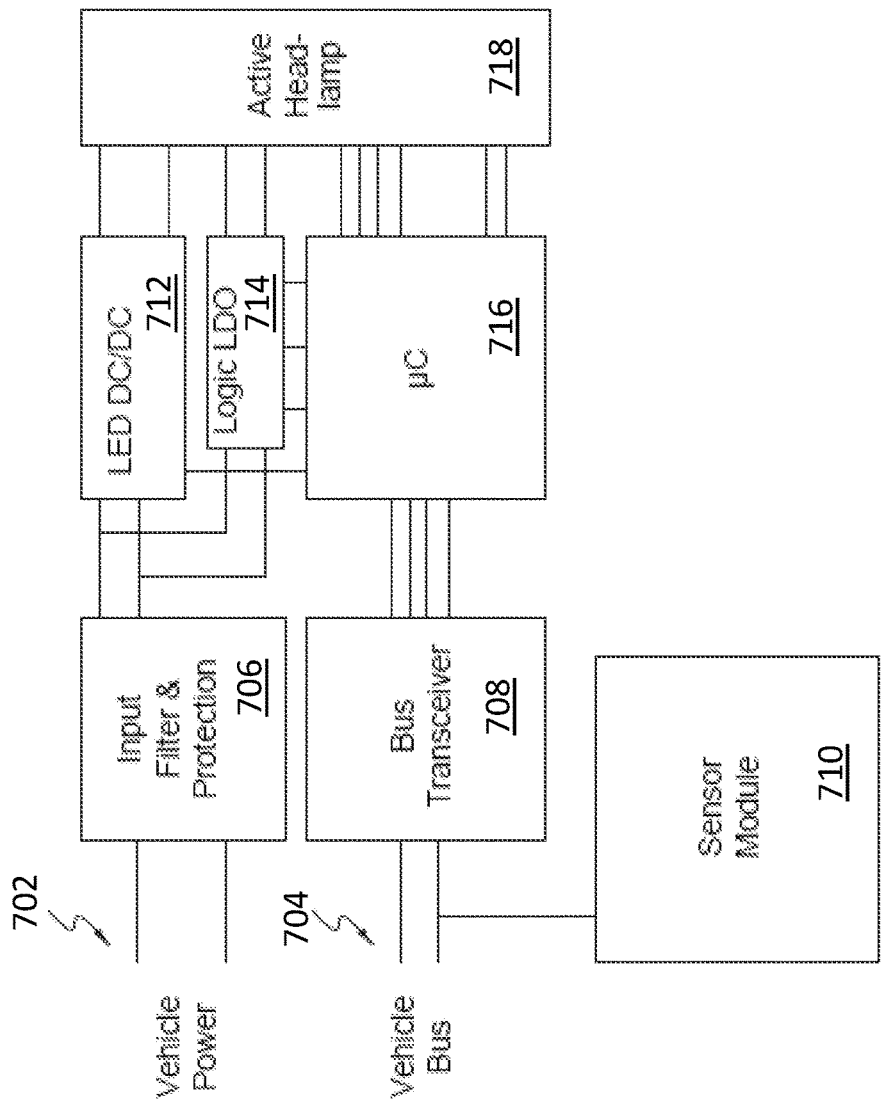
FIG. 7 is a diagram of an example vehicle headlamp system that may incorporate one or more of the embodiments and examples described herein.

FIG. 7 is a diagram of an example vehicle headlamp system 700 that may incorporate one or more of the embodiments and examples described herein. The example vehicle headlamp system 700 illustrated in FIG. 7 includes power lines 702, a data bus 704, an input filter and protection module 706, a bus transceiver 708, a sensor module 710, an LED direct current to direct current (DC/DC) module 712, a logic low-dropout (LDO) module 714, a micro-controller 716 and an active head lamp 718.

The power lines 702 may have inputs that receive power from a vehicle, and the data bus 704 may have inputs/outputs over which data may be exchanged between the vehicle and the vehicle headlamp system 700. For example, the vehicle headlamp system 700 may receive instructions from other locations in the vehicle, such as instructions to turn on turn signaling or turn on headlamps, and may send feedback to other locations in the vehicle if desired. The sensor module 710 may be communicatively coupled to the data bus 704 and may provide additional data to the vehicle headlamp system 700 or other locations in the vehicle related to, for example, environmental conditions (e.g., time of day, rain, fog, or ambient light levels), vehicle state (e.g., parked, in-motion, speed of motion, or direction of motion), and presence/position of other objects (e.g., vehicles or pedestrians). A headlamp controller that is separate from any vehicle controller communicatively coupled to the vehicle data bus may also be included in the vehicle headlamp system 700. In FIG. 7, the headlamp controller may be a micro-controller, such as micro-controller (μc) 716. The micro-controller 716 may be communicatively coupled to the data bus 704.

The input filter and protection module 706 may be electrically coupled to the power lines 702 and may, for example, support various filters to reduce conducted emissions and provide power immunity. Additionally, the input filter and protection module 106 may provide electrostatic discharge (ESD) protection, load-dump protection, alternator field decay protection, and/or reverse polarity protection.

The LED DC/DC module 712 may be coupled between the input filter and protection module 706 and the active headlamp 718 to receive filtered power and provide a drive current to power LEDs in the lighting device in the active headlamp 718. The LED DC/DC module 712 may have an input voltage between 7 and 18 volts with a nominal voltage of approximately 13.2 volts and an output voltage that may be slightly higher (e.g., 0.3 volts) than a maximum voltage for the light-emitting elements in the lighting device (e.g., as determined by factor or local calibration and operating condition adjustments due to load, temperature or other factors).

The logic LDO module 714 may be coupled to the input filter and protection module 706 to receive the filtered power. The logic LDO module 714 may also be coupled to the micro-controller 716 and the active headlamp 718 to provide power to the micro-controller 716 and/or electronics in the active headlamp 718, such as CMOS logic.

The bus transceiver 708 may have, for example, a universal asynchronous receiver transmitter (UART) or serial peripheral interface (SPI) interface and may be coupled to the micro-controller 716. The micro-controller 716 may translate vehicle input based on, or including, data from the sensor module 710. The translated vehicle input may include a video signal that is transferrable to an image buffer in the active headlamp 718. In addition, the micro-controller 716 may load default image frames and test for open/short pixels during startup. In embodiments, an SPI interface may load an image buffer in CMOS. Image frames may be full frame, differential or partial frames. Other features of micro-controller 716 may include control interface monitoring of CMOS status, including die temperature, as well as logic LDO output. In embodiments, LED DC/DC output may be dynamically controlled to minimize headroom. In addition to providing image frame data, other headlamp functions, such as complementary use in conjunction with side marker or turn signal lights, and/or activation of daytime running lights, may also be controlled.

Figure 8:
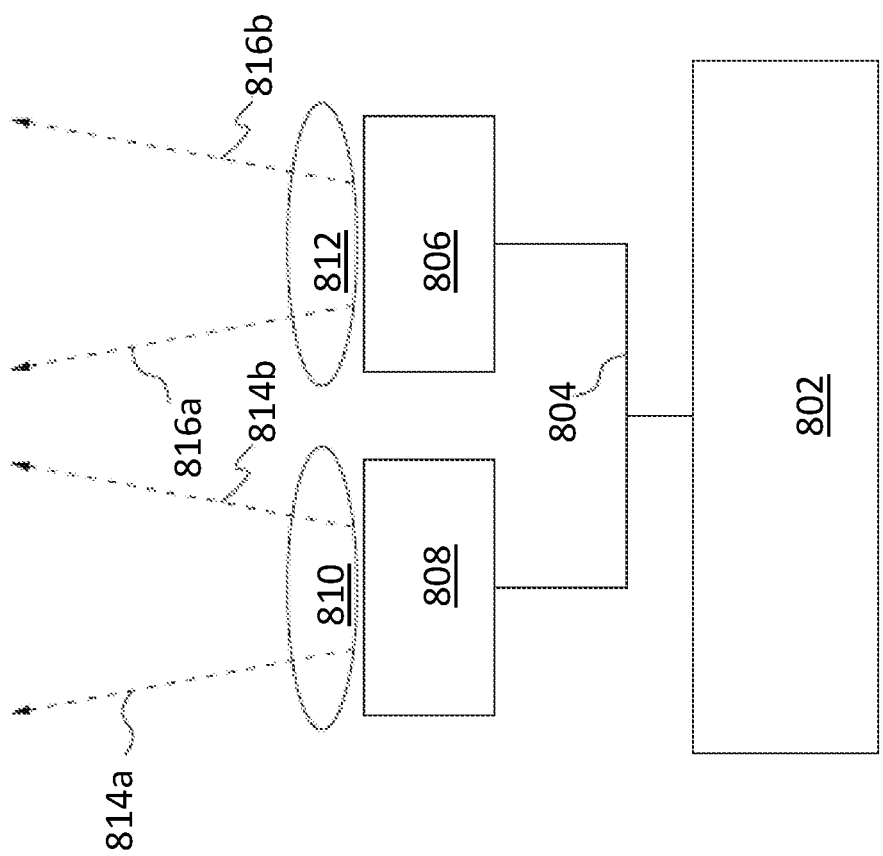
FIG. 8 is a diagram of another example vehicle headlamp system.

FIG. 8 is a diagram of another example vehicle headlamp system 800. The example vehicle headlamp system 800 illustrated in FIG. 8 includes an application platform 802, two lighting devices or systems 806 and 808, and secondary optics 810 and 812.

The lighting system or device 808 may emit light beams 814 (shown between arrows 814a and 814b in FIG. 8). The lighting system or device 806 may emit light beams 816 (shown between arrows 816a and 816b in FIG. 8). In the embodiment shown in FIG. 8, a secondary optic 810 is adjacent the lighting system or device 808, and the light emitted from the lighting system or device 808 passes through the secondary optic 810. Similarly, a secondary optic 812 is adjacent the lighting system or device 806, and the light emitted from the lighting system or device 806 passes through the secondary optic 812. In alternative embodiments, no secondary optics 810/812 are provided in the vehicle headlamp system.

Where included, the secondary optics 810/812 may be or include one or more light guides. The one or more light guides may be edge lit or may have an interior opening that defines an interior edge of the light guide. Lighting systems or devices 808 and 806 may be inserted in the interior openings of the one or more light guides such that they inject light into the interior edge (interior opening light guide) or exterior edge (edge lit light guide) of the one or more light guides, as described in detail above. In embodiments, the one or more light guides may shape the light emitted by the lighting systems or devices 808 and 806 in a desired manner, such as, for example, with a gradient, a chamfered distribution, a narrow distribution, a wide distribution, or an angular distribution.

The application platform 802 may provide power and/or data to the lighting systems or devices 806 and/or 808 via lines 804, which may include one or more or a portion of the power lines 702 and the data bus 704 of FIG. 7. One or more sensors (which may be the sensors in the vehicle headlamp system 700 or other additional sensors) may be internal or external to the housing of the application platform 802. Alternatively, or in addition, as shown in the example vehicle headlamp system 700 of FIG. 7, each lighting system or device 808 and 806 may include its own sensor module, connectivity and control module, power module, and/or LED array.

In embodiments, the vehicle headlamp system 800 may represent an automobile with steerable light beams where LEDs may be selectively activated to provide steerable light. For example, an array of LEDs or emitters may be used to define or project a shape or pattern or illuminate only selected sections of a roadway. In an example embodiment, infrared cameras or detector pixels within lighting systems or devices 806 and 808 may be sensors (e.g., similar to sensors in the sensor module 710 of FIG. 7) that identify portions of a scene (e.g., roadway or pedestrian crossing) that require illumination.

Having described the embodiments in detail, those skilled in the art will appreciate that, given the present description, modifications may be made to the embodiments described herein without departing from the spirit of the inventive concept. Therefore, it is not intended that the scope of the invention be limited to the specific embodiments illustrated and described.

What is claimed is:

1. A lighting device comprising:
  at least one light guide comprising an elongated recess;
  multiple light-emitting elements embedded into the elongated recess of the light guide, arranged on a flexfoil that is bendable in three different directions, and connected to one another to mimic a filament; and
  at least one encapsulating material that encapsulates, at least in part, the at least one light guide, and comprises:
    at least one opening, and
    at least one reference element located at a position for aligning the at least one light guide in relation to the encapsulating material so that the multiple light-emitting elements emit light exiting the opening,
    wherein the at least one encapsulating material is flexible so that the lighting device is bendable in the three different directions.

2. The lighting device according to claim 1, wherein the multiple light-emitting elements are arranged along a longitudinal direction of the lighting device.

3. The lighting device according to claim 2, wherein the multiple light-emitting elements are arranged with a density of at least one light-emitting element being arranged every 1 to 3 mm along the longitudinal direction.

4. The lighting device according to claim 3, wherein the flexfoil is coated, at least in part, with a phosphor coating defining at least one or more directions in which the multiple light-emitting elements emit light.

5. The lighting device according to claim 4, wherein the phosphor coating covers both sides of the flexfoil, wherein the multiple light-emitting elements are arrangeable on both sides of the flexfoil.

6. The lighting device according to claim 1, wherein the lighting device is configured as an endless semi-finished product having a length to be chosen after production.

7. The lighting device according to claim 6, wherein torsion of the lighting device is optically compensated by the light being emitted equally in all directions of the flexfoil.

8. The lighting device according to claim 1, wherein the at least one reference element is an elongated height extending along the opening in the longitudinal direction of the lighting device.

9. The lighting device according to claim 8, wherein the at least one reference element further enables a sealing of the at least one light guide and the encapsulating material.

10. The lighting device according to claim 1, further comprising:
  at least one optical element enabling diffusion of light emitted by the multiple light-emitting elements.

11. The lighting device according to claim 1, wherein the multiple light-emitting elements are embedded into the at least one light guide in such a way that an air chamber is present between the recess and the multiple light-emitting elements when they are embedded into the at least one light guide.

12. The lighting device according to claim 1, wherein the multiple light-emitting elements are in contact, at least in part, with the recess of the at least one light guide.

13. The lighting device according to claim 1, wherein the encapsulating material is or comprises silicone.

14. A method of manufacturing a lighting device, the method comprising:
  providing at least one light guide comprising an elongated recess;
  providing multiple light-emitting elements;
  arranging the multiple light-emitting elements on a flexfoil that is bendable in three different directions;
  connecting the multiple light-emitting elements to one another to mimic a filament;
  embedding the multiple light-emitting elements into the elongated recess of the light guide;
  providing at least one encapsulating material;
  encapsulating, at least in part, the at least one light guide with the at least one encapsulating material, wherein the encapsulating material comprises at least one opening for emitting light, the encapsulating including aligning the at least one light guide in relation to the encapsulating material so that the multiple light-emitting elements emit light exiting the opening by the at least one reference element engaging with the elongated recess of the light guide; and providing the lighting device configured as an endless semi-finished product having a length to be chosen after production.

15. An automotive lighting system comprising:
at least one lighting device comprising:
 at least one light guide comprising an elongated recess,
 multiple light-emitting elements embedded into the elongated recess of the light guide, arranged on a flexfoil that is bendable in three different directions, and connected to one another to mimic a filament, and
 at least one encapsulating material that encapsulates, at least in part, the at least one light guide, and comprises:
  at least one opening, and
  at least one reference element located at a position for aligning the at least one light guide in relation to the encapsulating material so that the multiple light-emitting elements emit light exiting the opening,
  wherein the at least one encapsulating material is flexible so that the lighting device is bendable in the three different directions;
at least one light-emitting element driver configured to provide a drive current to the at least one lighting device; and
a controller configured to receive at least one signal and provide at least one control signal the driver to turn the at least one light-emitting element ON and OFF according to the received at least one signal.

16. The automotive lighting system of claim 15, wherein the automotive lighting system is one of a head light, a back light, an interior light, or body light included in the body of a vehicle.

* * * * *